(12) United States Patent
Hu et al.

(10) Patent No.: US 8,100,722 B2
(45) Date of Patent: Jan. 24, 2012

(54) ELECTRICAL CARD CONNECTOR HAVING SPRING ARMS AND PROTRUSIONS TO INCREASE RETAINING FORCE FOR CARDS

(75) Inventors: Lan-Ping Hu, Shenzhen (CN); Yong-Hui Hu, Shenzhen (CN)

(73) Assignee: Hon Hai Precision Ind. Co., Ltd., Taipei (TW)

( * ) Notice: Subject to any disclaimer, the term of this patent is extended or adjusted under 35 U.S.C. 154(b) by 285 days.

(21) Appl. No.: 12/549,594

(22) Filed: Aug. 28, 2009

(65) Prior Publication Data

US 2010/0055985 A1 Mar. 4, 2010

(30) Foreign Application Priority Data

Aug. 31, 2008 (CN) .............................. 200820041730

(51) Int. Cl.
*H01R 24/00* (2011.01)
(52) U.S. Cl. ........................................ 439/626; 439/352
(58) Field of Classification Search .................. 439/626, 439/630, 188, 629, 153, 352
See application file for complete search history.

(56) References Cited

U.S. PATENT DOCUMENTS

| 6,641,441 B2* | 11/2003 | Liu .............................. 439/630 |
| 7,537,486 B2* | 5/2009 | Hong et al. .................. 439/626 |
| 7,544,097 B2* | 6/2009 | Hong et al. .................. 439/626 |
| 7,568,928 B2* | 8/2009 | Hou et al. ..................... 439/188 |

* cited by examiner

*Primary Examiner* — Tulsidas C Patel
*Assistant Examiner* — Travis Chambers
(74) *Attorney, Agent, or Firm* — Wei Te Chung; Andrew C. Cheng; Ming Chieh Chang

(57) ABSTRACT

An electrical card connector comprising: an insulating housing defining a plurality of channels; a terminal module with a plurality of contacts received therein; and a clip having a pair of first elastic pieces and a second elastic piece received in the corresponding channels; a metal shield shielding over the insulating housing for defining a card receiving space, at least a spring arm defined on a top face of the metal shield shielding protruding into the receiving space; a card receiving mechanism having a receiving frame, at least a block portion corresponding to the spring arm defined on a longitudinal side of the receiving frame which pressing against said spring arm when the card receiving mechanism inserted into the card receiving space for increasing the retaining force therebetween.

19 Claims, 4 Drawing Sheets

ELECTRICAL CARD CONNECTOR HAVING SPRING ARMS AND PROTRUSIONS TO INCREASE RETAINING FORCE FOR CARDS

BACKGROUND OF THE INVENTION

1. Field of the Invention

The present invention relates generally to electrical card connectors, and more particularly to an electrical card connector having protrusions and spring arms to increase retaining force for cards inserted therein.

2. Description of Related Arts

IC cards have been developed and a type of IC card called a subscriber identification module card (SIM card) is used in cellular phones as an identification and storage unit for subscriber related data. A SIM card normally includes a terminal array for connection through a SIM card connector to the external equipment.

A SIM card connector usually includes a card receiving mechanism for receiving the SIM card and a plurality of resilient contacts for engaging the terminal array of the card when the card is inserted into the connector. The card connector usually includes retaining elements for providing retaining force to the card receiving mechanism, so the card is prevented from shaking away from one side to the other in the card connector. But the card is movable in the vertical direction. Being movable always make a disconnection between the card and the contacts of the connector.

Hence, an improved electrical card connector is desired.

SUMMARY OF THE INVENTION

Accordingly, an object of the present invention is to provide an electrical card connector having protrusions and spring arms which cooperate with each other to increase retaining force for cards.

To achieve the above object, an electrical card connector includes an electrical card connector comprising: an insulating housing defining a plurality of channels; a terminal module with a plurality of contacts received therein; and a clip having a pair of first elastic pieces and a second elastic piece received in the corresponding channels; a metal shield shielding over the insulating housing for defining a card receiving space, at least a spring arm defined on a top face of the metal shield shielding protruding into the receiving space; a card receiving mechanism having a receiving frame, at least a block portion corresponding to the spring arm defined on a longitudinal side of the receiving frame which pressing against said spring arm when the card receiving mechanism inserted into the card receiving space for increasing the retaining force therebetween.

Other objects, advantages and novel features of the invention will become more apparent from the following detailed description when taken in conjunction with the accompanying drawings.

DETAILED DESCRIPTION OF THE PREFERRED EMBODIMENT

Figure 1:
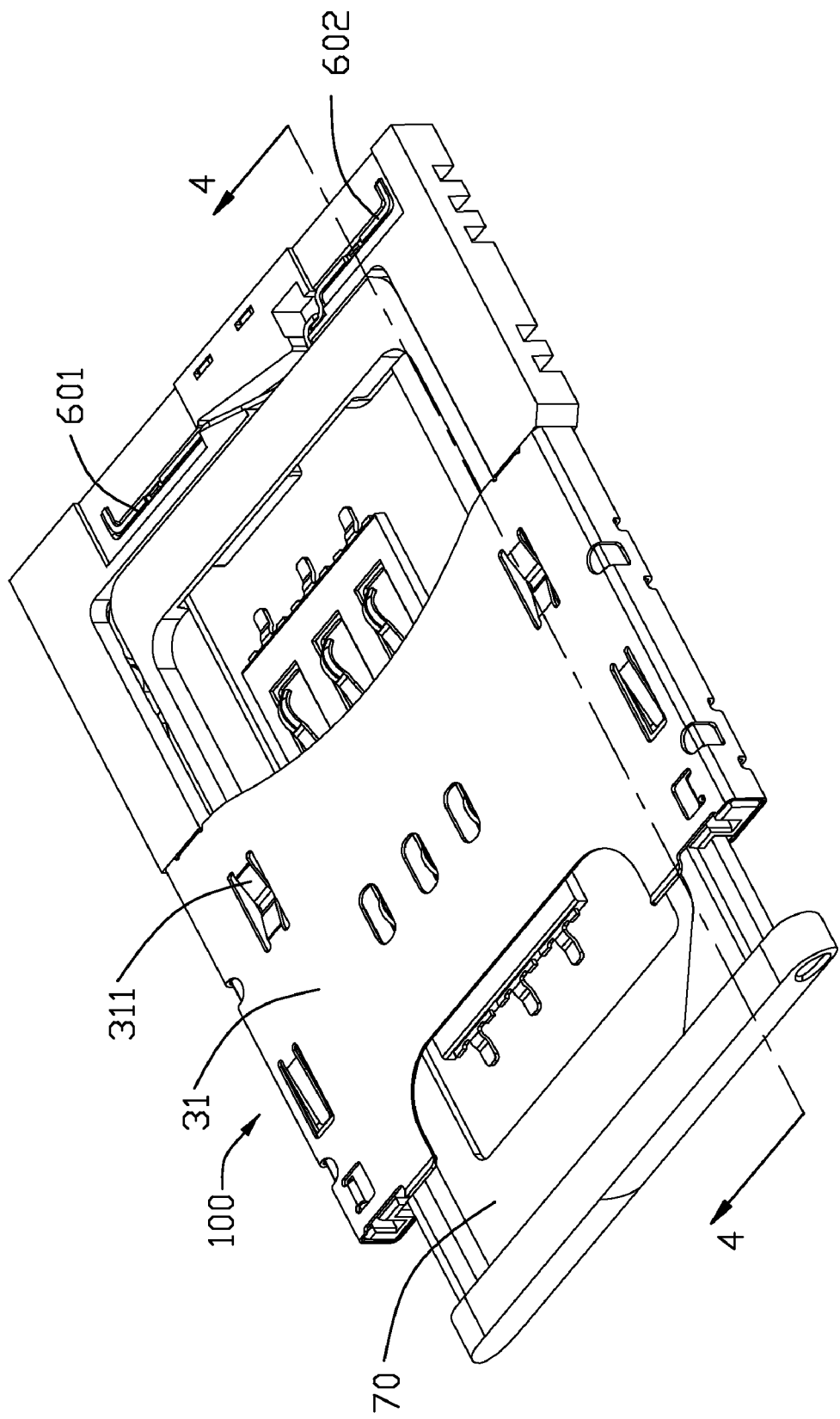
FIG. 1 is a perspective, assembled view of an electrical card connector according to the present invention.
Figure 2:
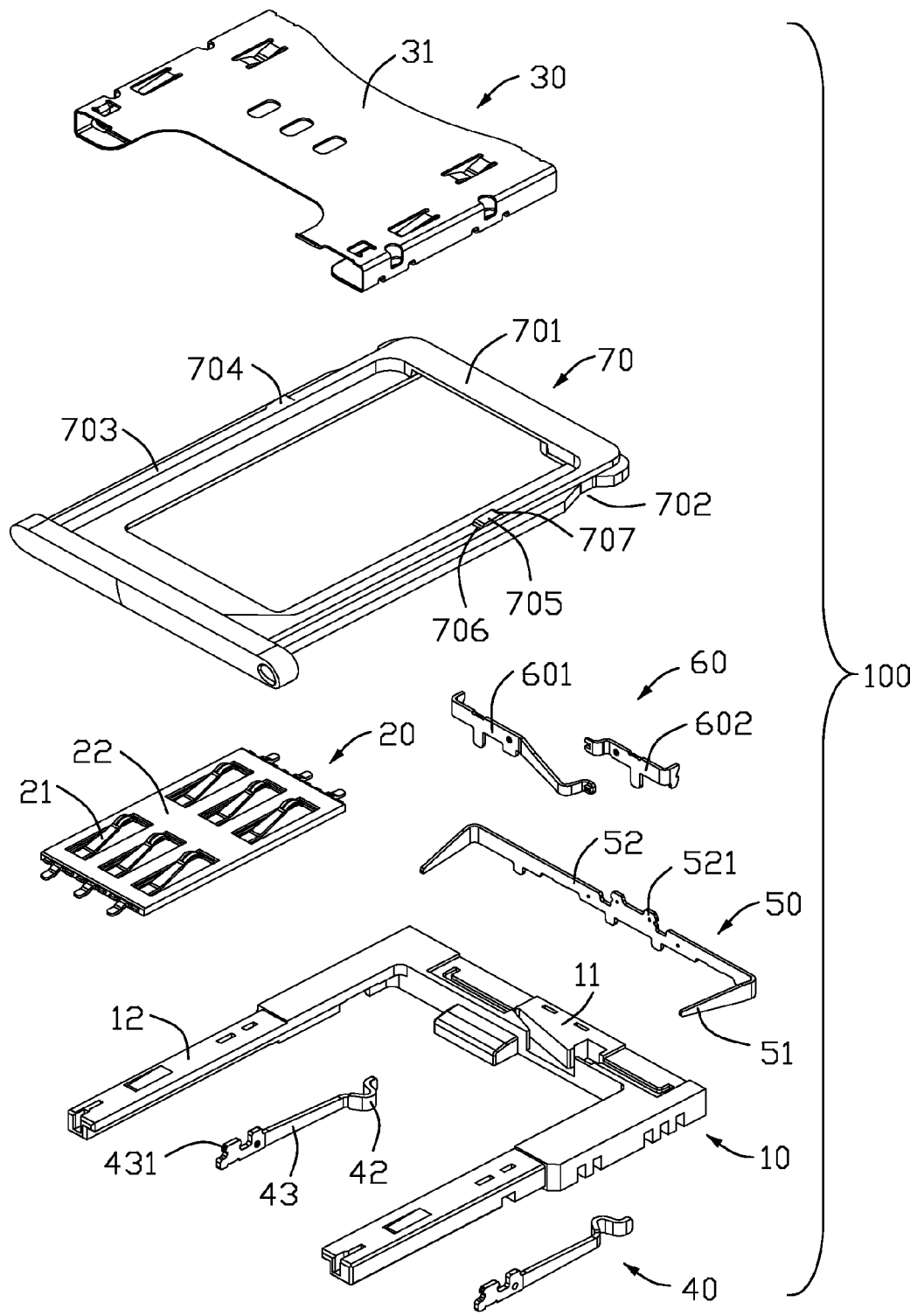
FIG. 2 is a perspective, exploded view of an electrical card connector.
Figure 3:
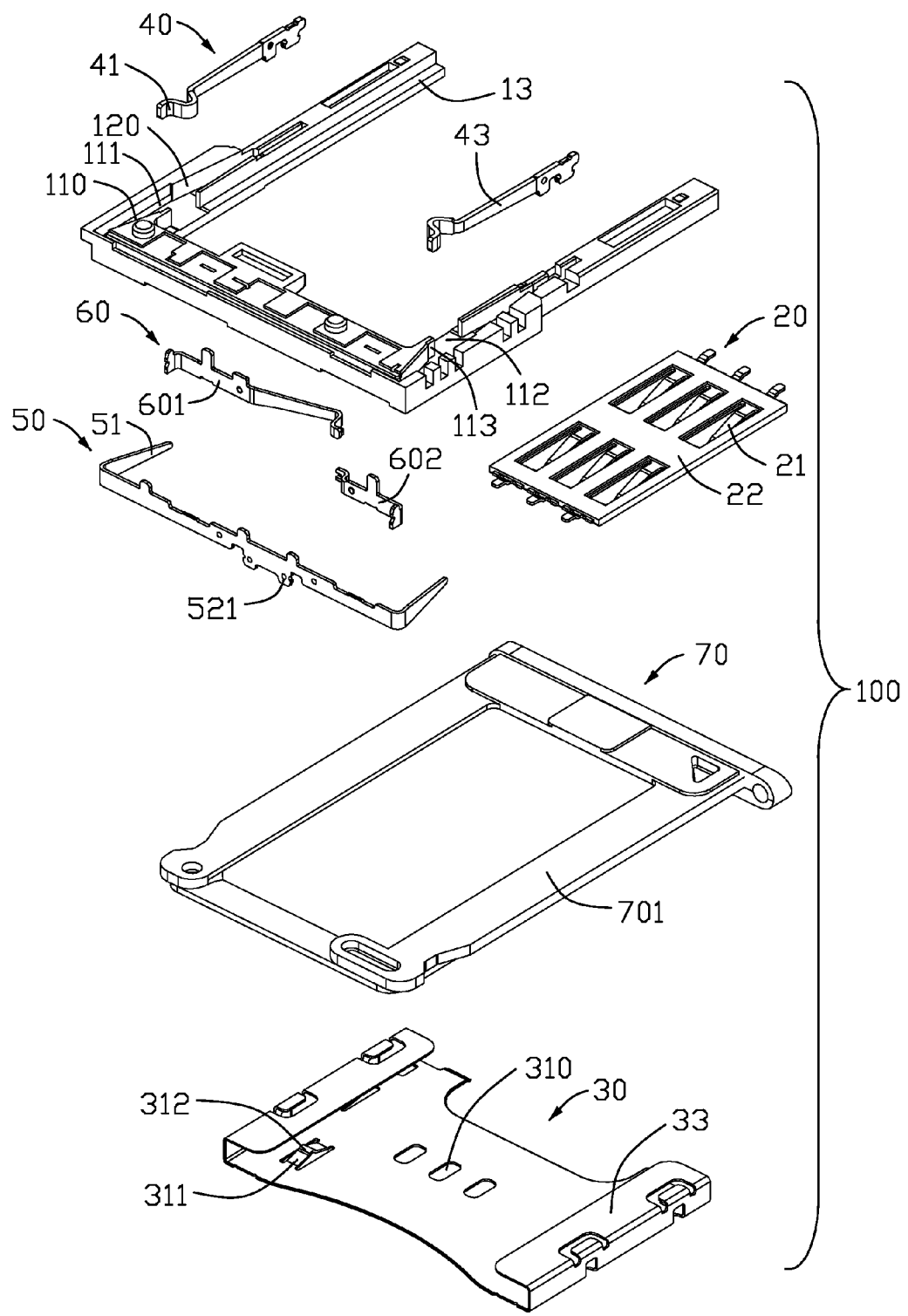
FIG. 3 is a perspective, exploded view of an electrical card connector from another view.

FIGS. 1-7 illustrate an electrical card connector 100 in accordance with the present invention, assembled on a printed circuit board (PCB) and comprising an insulating housing 10, a terminal module 20 with a plurality of contacts 21 received therein, a metal shield 30 assembled on and partly shielding over the insulating housing 10 for defining a card receiving space (not labeled), a pair of first elastic pieces 40, a second elastic piece 50 and a switch element 60. The first elastic pieces 40, the second elastic piece 50 and the switch element 60 are all received in the insulating housing 10. The first elastic pieces 40 and the second elastic piece 50 are defined as a clip (not labeled) for increasing retaining force for electrical cards. The electrical card connector further includes a card receiving mechanism 70; the card receiving mechanism 70 is inserted into the card receiving space with the card received therein.

The insulative housing 10 comprises a transversal wall 11 and a pair of longitudinal walls 12 integrated with the transversal wall 11. Each longitudinal wall 12 defines a first receiving channel 120 for receiving the first elastic piece 40. The transverse arm 11 defines a second receiving channel 110 for receiving the lengthwise arm 51 of the second elastic piece 50. A connecting channel 111 is defined at a jointing corner of the transversal wall 11 and the longitudinal wall 12 for communicating with each first receiving channel 120 and the second receiving channel 110. The connecting channel 111 is used for receiving the flexible arm 51 of the second elastic piece 50. The connecting channel 111 has different widths, a first end thereof communicating with the second receiving channel 110 is a little narrower and a second end thereof communicating with the first receiving channel 120 is a little wider. The insulating housing 10 defines a cutout 112 with opening towards the card receiving space, which is adjacent to the second end of the connecting channel 111. Beside the cutout 112, the longitudinal wall 11 further comprises a guiding portion 13 adjacent to the card receiving space and a supporting surface 123 to support the second contact portion 41.

Figure 4:
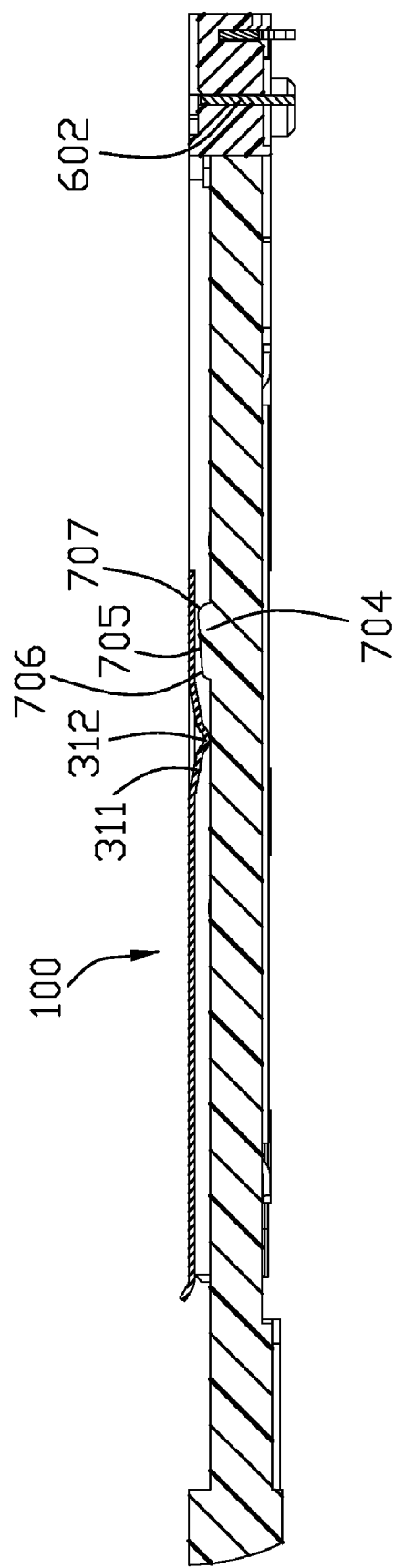
FIG. 4 is a a cross sectional view of the electrical card connector with the card receiving mechanism fully inserted thereinto.

Referring to FIGS. 4-5, the first elastic piece 40 of the clip forms a main portion 43, a first contact portion 42 curvedly extending from one end of the main portion 43 and a second contact portion 41 extending from a free end of the first contact portion 42. The main portion 43 forms a plurality of fixing portions 431 for orientation of the first elastic piece 40. The second elastic piece 50 of the clip forms a lengthwise arm 52 and a pair of flexible arms 51 extending from two ends of the lengthwise arm 52. The lengthwise arm 52 forms a plurality of retaining portions 521 for orientation of the second elastic piece 50. The flexible arms 51 deflect towards each other, i.e. the flexible arm 51 and the lengthwise arm 52 defines an angle less than 90°. In a preferred embodiment, the flexible arm 51 is taper-shaped. However, a figure of the flexible arm 51 is not limiting, other figures of the flexible arm 51 are also feasible.

The first contact portion 42 protrudes into the card receiving space through the cutout 111 and the second contact portion 41 abuts against the supporting surface 123 when the first elastic piece 40 is received in the first receiving channel 120 and is fixed with the insulating housing 10 by virtue of the fixing portions 431. The flexible arm 51 contacts with the second contact portion 41 of the first elastic piece 40 when the flexible arm 51 is received in the connecting channel 111 and correspondingly the lengthwise arm 52 of the second elastic piece 50 is received in the second receiving channel 110.

Furthermore, the second elastic piece 50 is fixed with the insulating housing 10 by virtue of the retaining portions 521.

The switch element 60 is received in the specific receiving channel (not labeled) of the transversal wall 11 and comprises a movable piece 601 and a stationary piece 602 contacted with the movable piece 601 when a card is not inserted in the card receiving space. The movable piece 601 has an arch portion protruding into the card receiving space to be pressed against the inserted card and a mating interface located behind that of the stationary piece 602, which makes detachment between the movable piece 601 and the stationary piece 602 when the card is inserted in the card receiving space.

The metal shield 30 comprises a flat portion 31 and a pair of bending portions 33 extending from two edges of the flat portion 31 for shielding over the longitudinal walls 12 of the insulating housing 10 and so, the metal shield 30 is assembled on the insulating housing 10 for ESD. The flat portion 31 defines a row of through holes 310 at an approximately middle part thereof. And a pair of spring arms 311 is defined symmetrically and downwardly protruding into the receiving space. Each spring arm 311 includes a contact portion 312 which is cambered.

The terminal module 20 forms an insulated base 22. The contacts 21 are arranged in two rows and received in the insulated base 22.

The card receiving mechanism 70 comprises a receiving frame 701 with a pair of notches 702 defined on the longitudinal sides 703, the first contact portions 42 extend into and retain with the notches correspondingly to keep a retention force horizontally when the card receiving mechanism 70 is inserted into the receiving space. A pair of block portions 704 is defined on the longitudinal sides 703 protruding upwardly, the block portion 704 has a wedged surface 705 which defines a lower end 706 and a higher end 707, the higher end 707 is adjacent to the transversal wall 12 and higher than the lower end 706.

In use, an card receiving mechanism 70 is inserted into the card receiving space under the guidance of the guiding portion 13 of the insulating housing 10. The card receiving mechanism 70 contacts with and presses on the first contact portions 42 of the first elastic pieces 40 to drive the second contact portions 41 to press against the flexible arms 51 of the second elastic piece 50 outwardly. Because of elasticity of the flexible arms 51, the flexible arms 51 press against the second contact portions 41 reversely to act on the inserted card 70 and so, to provide retaining force for the inserted card 70. During insertion, the spring arm 311 presses against the block portion 704 firstly, because of the wedged surface 705, the block portion 705 can offer the user a kind of click feeling; and then, the spring arm 311 surpass the block portion 704. After inserting totally, the spring arm 311 presses against the upper surface (not labeled) of the receiving frame 701 and help to keep a good retaining force between the card receiving mechanism 70 and the insulative housing 10.

The card receiving mechanism 70 is prevented from shifting away from one side to the other in the card socket of course. The electrical connection between the card and the contacts 21 is achieved when the card receiving mechanism 70 presses the movable piece 601 of the switch element 60 to separate from the stationary piece 602. The first elastic piece 40 bears against the second elastic piece 50 along a direction perpendicular to the card insertion direction, while the movable piece 601 moves away from the stationary piece 602 of the switch element 60 along the card insertion direction.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulative housing defining a plurality of channels;
   a terminal module having a plurality of contacts; and
   a clip having a pair of first elastic pieces and a second elastic piece received in the corresponding channels;
   a metal shield shielding over the insulating housing for defining a card receiving space, at least one spring arm defined on a top face of the metal shield shielding and protruding into the receiving space;
   a card receiving mechanism having a receiving frame, at least one block portion corresponding to the spring arm defined on a longitudinal side of the receiving frame and pressing against said spring arm when the card receiving mechanism is inserted into the card receiving space for increasing the retaining force therebetween.

2. The electrical card connector as described in claim 1, wherein each of the first elastic pieces forms a first contact portion and a second contact portion, the first contact portion laterally protrudes into the card receiving space for engaging with the card receiving mechanism and the second elastic piece forms a flexible arm interfering with the second contact portion.

3. The electrical card connector as described in claim 1, wherein the block portion defines a wedge surface which has a lower end and a higher end, the higher end located more adjacent to the clip than the lower end.

4. The electrical card connector as described in claim 1, wherein the insulative housing comprises a transversal wall and a pair of longitudinal walls integral with the transversal wall, and each of the longitudinal walls defines a first receiving channel to receive a corresponding one of the first elastic pieces.

5. The electrical card connector as described in claim 4, wherein the transversal wall defines a second receiving channel and the second elastic piece forms a lengthwise arm received in the second receiving channel.

6. The electrical card connector as described in claim 5, wherein the insulative housing defines a connecting channel communicating the first and second receiving channels and the flexible arm is received in the connecting channel.

7. The electrical card connector as described in claim 6, wherein the flexible arm is tapered.

8. The electrical card connector as described in claim 6, wherein the flexible arm and the lengthwise arm define an acute angle.

9. The electrical card connector as described in claim 6, wherein the connecting channel defines a first end communicating with the second receiving channel and a second end communicating with the first receiving channel, and the first end is narrower than the second end.

10. The electrical card connector as described in claim 9, wherein a supporting surface is formed adjacent to the second end of the connecting channel.

11. The electrical card connector as described in claim 10, wherein the insulating housing defines a cutout with an opening towards the card receiving space and adjacent to the supporting surface.

12. The electrical card connector as described in claim 10, wherein the first contact portion of the first elastic piece protrudes into the card receiving space through the cutout and the second contact portion abuts against the supporting surface.

13. An electrical card connector, comprising:
an insulative housing having first, second, third sidewalls to commonly define a frame border with a front frame entrance along a first inserting direction;
a terminal module having a plurality of contacts insert-molded thereinto, the terminal module disposed within said frame border;
a metal shield shielding over the insulating housing to define a frame space, said metal shield having on a top face at least one elastic piece with a curved engaging section downwardly entering said frame space;
a card frame for receiving of a card, the card frame insertable into the frame border via said front frame entrance, the card frame having a protruding part to cooperate with the curved engaging section of the metal shield to generate a push force along the first inserting direction, and a pull force along a second direction opposite to the first inserting direction.

14. The electrical card connector as claimed in claim 13, wherein said protruding part has a higher end and a lower end, the higher end located more adjacent to the front frame entrance than the lower end along said inserting direction.

15. The electrical card connector as claimed in claim 13, wherein said at least one elastic piece is unitarily formed with the metal shield.

16. An electrical connector assembly comprising:
an insulative housing defining a U-shaped configuration in a top view with a receiving space therein;
a terminal module positioned in the receiving space with a plurality of terminals for soldering to a printed circuit board on which said terminal module is seated;
a metallic shell assembled on a top face of the housing and at least partially cover the receiving space and said terminal module in a vertical direction; and
a card receiving mechanism, for holding a card therein, moveably received in the receiving space along a front-to-back direction perpendicular to the vertical direction for having said card electrically and mechanically engaged with the terminal module; wherein;
at least one of said shell and said card receiving mechanism includes a protrusion extending toward the other in the vertical direction for resulting in constant point type engagement therebetween in said vertical direction.

17. The electrical connector assembly as claimed in claim 16, wherein said card receiving mechanism includes a transverse bar at a front end thereof under condition that said transverse bar is higher than the terminal module in the vertical direction.

18. The electrical connector assembly as claimed in claim 16, wherein said protrusion is formed on the shell.

19. The electrical connector assembly as claimed in claim 18, wherein said protrusion is deflectable.

* * * * *